United States Patent
Koski et al.

(10) Patent No.: US 8,406,907 B2
(45) Date of Patent: Mar. 26, 2013

(54) SETTING AUDIO PARAMETERS IN A DIGITAL SIGNAL PROCESSOR IN AN ELECTRONIC DEVICE, AND ELECTRONIC DEVICE

(75) Inventors: Ari Koski, Tampere (FI); Jouko Salo, Tampere (FI)

(73) Assignee: Nokia Mobile Phones Limited, Espoo (FI)

(*) Notice: Subject to any disclaimer, the term of this patent is extended or adjusted under 35 U.S.C. 154(b) by 1239 days.

(21) Appl. No.: 12/136,449

(22) Filed: Jun. 10, 2008

(65) Prior Publication Data

US 2008/0243282 A1    Oct. 2, 2008

Related U.S. Application Data

(63) Continuation of application No. 09/019,614, filed on Feb. 6, 1998.

(30) Foreign Application Priority Data

Feb. 21, 1997  (FI) .......................................... 970743

(51) Int. Cl.
*G06F 17/00*  (2006.01)
(52) U.S. Cl. ....................................................... 700/94
(58) Field of Classification Search .................. 700/94; 381/103; 710/303, 304
See application file for complete search history.

(56) References Cited

U.S. PATENT DOCUMENTS

| | | | |
|---|---|---|---|
| 4,823,391 A | 4/1989 | Schwartz | |
| 5,297,191 A | 3/1994 | Gerszberg | |
| 5,414,751 A | 5/1995 | Yamada | |
| 5,418,837 A | 5/1995 | Johansson et al. | |
| 5,497,446 A | 3/1996 | Aso | |
| 5,521,976 A | 5/1996 | Janosch et al. | |
| 5,636,264 A | 6/1997 | Sulavuori et al. | |
| 5,689,823 A | 11/1997 | Phillips | |
| 5,715,522 A | 2/1998 | Vimpari et al. | |
| 5,786,782 A | 7/1998 | Ostman et al. | |
| 5,797,102 A | 8/1998 | Hallikainen et al. | |
| 5,819,175 A | 10/1998 | Niemi | |
| 5,881,103 A | 3/1999 | Wong et al. | |
| 5,903,849 A | 5/1999 | Selin et al. | |
| 5,903,850 A | 5/1999 | Huttunen et al. | |
| 5,926,756 A | 7/1999 | Piosenka et al. | |
| 5,946,391 A | 8/1999 | Dragwidge et al. | |
| 5,991,639 A | 11/1999 | Rautiola et al. | |
| 6,028,892 A | 2/2000 | Barabash et al. | |
| 6,031,825 A | 2/2000 | Kaikuranta et al. | |

(Continued)

FOREIGN PATENT DOCUMENTS

| | | |
|---|---|---|
| GB | 2261572 | 5/1993 |
| JP | 64-3700 | 1/1989 |

(Continued)

OTHER PUBLICATIONS

Japanese Office Action dated Jan. 25, 2011.

(Continued)

*Primary Examiner* — Xu Mei
(74) *Attorney, Agent, or Firm* — Harrington & Smith (57) ABSTRACT

The invention relates to a method for setting audio parameters in a digital signal processor in an electronic device including at least one auxiliary device connection for connecting at least one auxiliary device. At least some of the audio parameters can be loaded into the digital signal processor during operation of the electronic device either from the auxiliary device or from a writeable mass storage.

15 Claims, 4 Drawing Sheets

U.S. PATENT DOCUMENTS

| | | | |
|---|---|---|---|
| 6,128,509 | A | 10/2000 | Veijola et al. |
| 6,148,243 | A | 11/2000 | Ishii et al. |
| 6,674,864 | B1 | 1/2004 | Kitamura |
| 6,748,209 | B2 | 6/2004 | Lipsit |
| 8,086,332 | B2 * | 12/2011 | Dorogusker et al. ........... 700/94 |

FOREIGN PATENT DOCUMENTS

| | | |
|---|---|---|
| JP | 04328797 | 11/1992 |
| JP | 5020945 | 1/1993 |
| JP | 520945 | 3/1993 |
| JP | 6311592 | 11/1994 |
| JP | 6327089 | 11/1994 |
| JP | 7015280 | 1/1995 |
| JP | 7015789 | 1/1995 |
| JP | 8084090 | 3/1996 |
| JP | 8205300 | 8/1996 |
| JP | 8317041 | 11/1996 |
| JP | 10209951 | 7/1998 |
| WO | 94/13087 | 6/1994 |
| WO | 95/19096 A1 | 7/1995 |
| WO | 9738488 A1 | 10/1997 |

OTHER PUBLICATIONS

Japanese Office Action dated Aug. 22, 2011.
Japanese Office Action dated May 10, 2011.
Japanese Office Action dated Jul. 13, 2010.
Malvino, et al., Digital Principles and Applications, fourth edition, pp. 379-421, 1986.

* cited by examiner

SETTING AUDIO PARAMETERS IN A DIGITAL SIGNAL PROCESSOR IN AN ELECTRONIC DEVICE, AND ELECTRONIC DEVICE

CROSS-REFERENCE TO RELATED APPLICATIONS

This application is a continuation of, claims priority from and the benefit of U.S. application Ser. No. 09/019,614 filed on Feb. 6, 1998, now pending, which claims priority from and the benefit of Finnish Application No. 970743 filed on Feb. 21, 1997, the disclosures of which are incorporated herein by reference in their entirety.

FIELD

The disclosed embodiments relate to a method for setting audio parameters in a digital signal processor in an electronic device, as well as to an electronic device.

BACKGROUND ART

Many electronic devices have the possibility of connecting to them various auxiliary devices for providing the electronic device for example with new functions. For example, a modem can be connected to the expansion slot of a computer, wherein the computer can be used for data transmission in a telecommunication network. Also, audio cards have been developed for producing different sounds with the computer. By using audio cards, it is even possible to control the computer with spoken commands. It is obvious that the audio parameters required in modem use are different from those required e.g. for playing music by means of a computer with an audio card.

For example to modern mobile stations it is possible to connect inter alia hands free units, modems, telefaxes, and computers. Each auxiliary device has its own special requirements for processing the audio signal of the mobile station in order to achieve sufficient quality of the audio signal. In a car, the acoustic environment differs from the acoustics of a room, wherein the processing of the audio signal of hands free equipment requires different reproducing qualities than when using the earphone and microphone of the mobile station itself.

This problem did not occur with earlier mobile stations, because it was usually possible to connect to the mobile station only one auxiliary device whose properties were known, and the mobile station could be optimized according to the properties of this auxiliary device.

In modern mobile stations, auxiliary devices of different types are taken into account when designing the mobile station; an attempt is made to find all the settings with which the mobile station would operate in an optimal way with all the auxiliary devices intended to be connected with the mobile station in question. However, it is thus not possible to achieve the best possible setting with each of the auxiliary devices, but the audio parameters stored in the mobile station are often a compromise between different features.

One problem with the methods of prior art is that a change in the parameters cannot be easily implemented afterwards, because the introduction of new parameters in the device would require installation of a new circuit containing inter alia the read-only memory of the digital signal processor. In practice, possible new auxiliary devices and their features will be first taken into account in devices of the next generation. Even this involves the problem that the parameters are optimized to be generally used, wherein compromises cannot be avoided. Further, one problem is that deadlines for introducing new products on the market are very strict, wherein it is usually not possible to make changes in the parameters at the last moment, but the changes are left to the next version.

Further, all users do not necessarily even need all the possible auxiliary devices that can be connected to a mobile station, wherein for such a user the optimization of the parameters is not always the best alternative.

The International Patent Application No. PCT/FI95/00005 previously filed by the Applicant introduces an arrangement for adjusting the signal level in mobile stations. The method presented in this publication is based on the fact that the most suitable signal levels obtained for different auxiliary devices are stored in the mobile station, and upon connecting the auxiliary device, the mobile station recognizes the type of the auxiliary device, wherein the mobile station retrieves from the stored information the value corresponding to the auxiliary device in question and adjusts the audio signal level accordingly. Thus the system presented in this publication applies for each auxiliary device type a certain pre-set value stored in the mobile station. Consequently, the manufacturer of the mobile station should already at the manufacturing stage know the most advantageous setting value of the audio signal level for each auxiliary device.

The best possible superimposing is not always obtained by changing the signal level only, but also other adjustment parameters are needed for influencing the travel of the audio signal in the mobile phone. In current mobile stations, the processing of audio signals takes place primarily in a digital signal processor (DSP) comprising a central processing unit (CPU), a read only memory (ROM), a random access memory (RAM), as well as means for connecting the digital signal processor with the other electronics in the device. The instruction set of the digital signal processor is designed to be adaptable especially in signal processing. The application software of the digital signal processor can implement very different types of signal processing operations particularly for audio signals, such as low pass, high pass and band pass filters, signal counting, echo and noise suppression, graphic and/or parametric equalizators, etc. according to the need. Thus the program codes required for making the desired operation are stored in the application software, for example to implement band pass filtering. In addition to the program code, the digital signal processor must still be given the parameters according to which each signal processing operation is to be carried out. For example in band pass filtering, the frequency values defining the pass band must be given, e.g. the lower limit frequency and the upper limit frequency, as is known to an expert in the field. The program code and the parameters are typically stored in the read only memory ROM.

SUMMARY

The aspects of the disclosed embodiments provide a method for loading the audio parameters into the signal processor of the electronic device according to the type of the auxiliary device to be connected to the electronic device, wherein the above-mentioned drawbacks of prior art can be eliminated to a major extent. The disclosed embodiments are based on the idea that the audio parameters are loaded either from the auxiliary device or from a writeable mass storage circuit, such as a flash memory, to the digital signal processor of the electronic device, such as a mobile station.

The aspects of the disclosed embodiments give significant advantages. Using the method of the disclosed embodiments, it is possible to set the audio properties also for an electronic device that is already in use in a way that the audio parameters are the best suitable for each auxiliary device, wherein it is no longer necessary to make compromises in setting the audio parameters. Further, the production of electronic devices can be made faster and more efficient, because it is no longer necessary to store the audio parameters in the electronic device at the manufacturing stage, but it is most advantageous to use an auxiliary device or a writeable mass storage for storing the audio parameters, wherein the functions of the auxiliary device connected to the electronic device are utilized in the most efficient way. Also, the tuning of audio parameters is remarkably more advantageous, because there will be no problems with deadlines in respect of the electronic device itself and further there will be no need to change a new program memory circuit for changing the parameters.

BRIEF DESCRIPTION OF THE DRAWINGS

The aspects of the disclosed embodiments will be described in more detail below with reference to the appended drawings. In the drawings.

DETAILED DESCRIPTION OF THE DISCLOSED EMBODIMENTS

Figure 1:
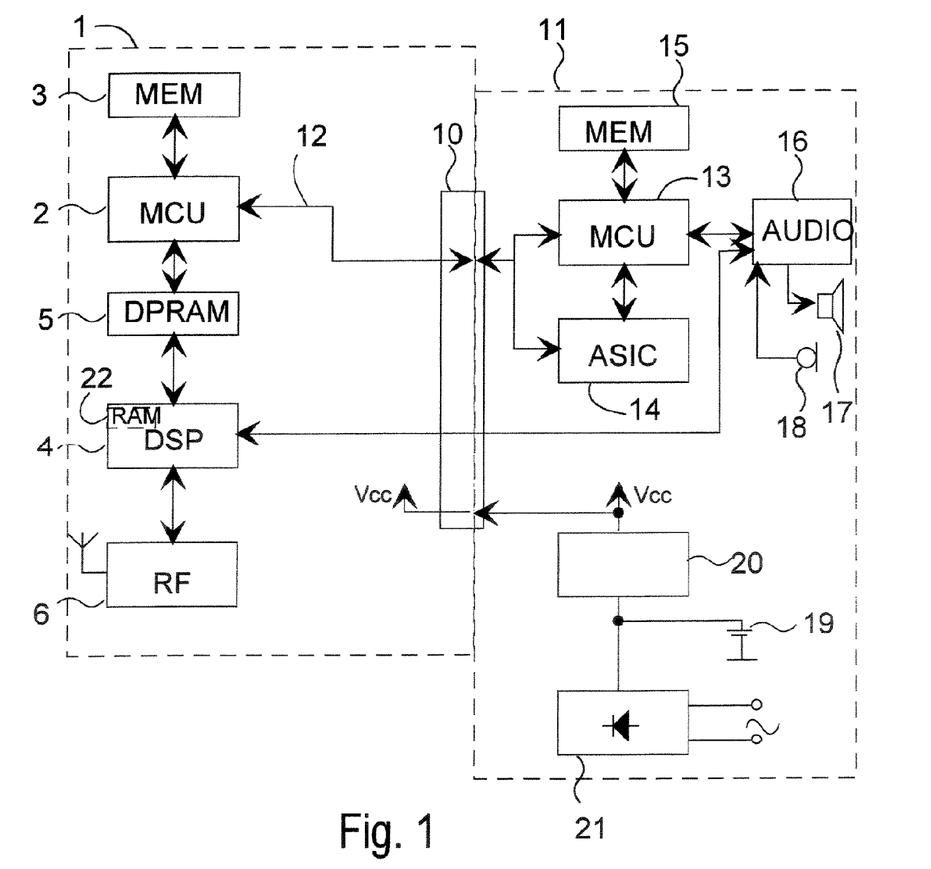
FIG. 1 shows a device in which the aspects of the disclosed embodiments can be advantageously applied.

In the example of FIG. 1, the electronic device 1 is a PCMCIA type card comprising the most important functional blocks of a mobile station, which are shown in a reduced manner in FIG. 1. The operations of the electronic device 1 are primarily controlled by a controller 2, such as a micro controller unit MCU. The controller 2 is provided with a memory 3, such as a read only memory and a random access memory (ROM, RAM). For signal processing of the electronic device, the card has a digital signal processor 4. The controller 2 and the digital signal processor 4 are connected with each other by a control and data connector 5, by means of which the controller 2 can inter alia transfer control information to the digital signal processor 4 as well as to load setting and other information into the random access memory of the digital signal processor 4. The control and data connector 5 comprises e.g. a dual port RAM. One port, namely the first control and data bus, of the dual port RAM is connected to the control and data bus of the controller 2, and the second port is connected to the control and data bus of the digital signal processor 4. Information can be transferred from the controller 2 to the digital signal processor 4 via the dual port RAM advantageously so that the controller 2 writes the data (bytes) to be transferred to the storage area of the first port. Next, the controller 2 writes one byte to a certain address in the first port, effecting a change in the state of the interrupt line in the second port. This interrupt line is connected with the interrupt line of the digital signal processor 4, wherein the digital signal processor 4 moves on to run the corresponding interrupt service program. This interrupt service program contains instructions by which the digital signal processor 4 reads the corresponding storage area from the dual port RAM and transfers the read data into its own random access memory. Reading the data will return the state of the interrupt line. Data transmission in the opposite direction is conducted accordingly.

The digital signal processor 4 conducts processing of demodulated signals from a high frequency component 6 (RF).

The digital signal processor 4 tends inter alia to suppress noise and disturbances in the received, demodulated signal, to modify the received, demodulated audio signal according to the earphone 17 or the like to be used at the time, to suppress background noise from the microphone signal, etc. In the digital signal processor 4, it is possible to implement several signal processing algorithms by programming the program commands corresponding to these operations in the application software. Consequently, several types of filters can be achieved, including filters whose implementation is not possible or reasonable with the analog technique.

In the digital signal processor, the audio signals are in digital form, wherein analog/digital converters (A/D) are required for converting the analog signals, such as the signal formed by a microphone 18, into digital form, and digital/analog converters (D/A) for converting the digital signal to an analog signal to be conveyed e.g. to the headphone 17. These A/D and D/A converter are in this embodiment contained in the audio coding/decoding circuit 16 (Codec) shown in the block diagram of FIG. 1, applying pulse coded modulation (PCM) which is known as such.

An attempt has been made to make the audio signal processing operations adaptable to the specific features required at the time. This can be implemented advantageously in a way that the algorithms are implemented at least partly according to the parameters, wherein a change in the value of a parameter will also change the result of the algorithm. This is useful e.g. when the filter pass line needs to be changed. In electronic devices of prior art, the parameters are stored in the read only memory (ROM) of the digital signal processor, wherein the parameters cannot be changed even though the auxiliary device 11 were changed.

The electronic device 1 comprises further one or several auxiliary device connections 10 implemented e.g. according to the PCMCIA standard, but the invention is not limited merely to connectors of this type. Thus the auxiliary device connection 10 comprises a female contact and the auxiliary device 11 comprises a male contact. The connection lines and contacts of the connector 10 are not shown in full but in a reduced manner, comprising only the most essential features for understanding the description.

An expansion bus 12 is conveyed from the controller 2 to the auxiliary device connection 10 for transferring control and data signals between the electronic device 1 and the auxiliary device 11. The expansion bus 12 can be a data or control bus of any kind. It can also be a link based on infrared data transmission (IR link) or radio frequency data transmission (RF link).

The auxiliary device can be a unit of the type of a personal digital assistant (PDA), a portable computer (PC) as shown in FIG. 1, a telephone handset, hands free equipment for a mobile station, etc.

In the application example shown in FIG. 1, the auxiliary device 11 is a portable computer comprising inter alia a microprocessor 13 which primarily controls the operations of the data processor 11. Further, the data processor 11 comprises an application-specific integrated circuit 14 (ASIC) for carrying out most of the logical operations of the data processor 11 and reducing the number of separate logic circuits in the data processor 11. Also the data processor 11 has a memory 15, such as a read-only memory for storing the basic software of the data processor 11 and a random access memory e.g. for storing information needed during the processing. Further, the data processor 11 shown in FIG. 1 comprises an audio block 16 which during a call is also used as the audio coding/decoding block of the electronic device, a loudspeaker 17 and a microphone 18, wherein the data processor can be used for forming audio messages and receiving for example control commands given by the user, if the operating system of the data processor allows control by voice commands.

The supply voltages needed by the data processor 11 are supplied from a battery 19 via a voltage transformer coupling 20. The battery 19 of the data processor 11 can be recharged, when necessary, e.g. from mains voltage via a charging device 21.

In this embodiment example according to FIG. 1, the electronic device 1 has no supply voltage source of its own, but it receives its supply voltage from the voltage transformer coupling 20 of the data processor 11 used as the auxiliary device, via the auxiliary device connection 10.

The loudspeaker 17 and the microphone 18 of the data processor can be integrated in the housing of the data processor 11, or it is possible also to use an external loudspeaker and microphone which are connected to the data processor 11 with wires.

In the following, the operation of the coupling shown in FIG. 1 will be described in those respects as will be necessary for understanding the invention.

After turning on the voltages, the microprocessor 13 of the data processor runs the initial load program inter alia for booting the operating system into the random access memory for example from a fixed disk (not shown). After the initial operations, the use of the data processor can be started for example by starting an application program, such as a terminal program. In a corresponding manner, the controller 2 of the electronic device conducts its own initializing operations according to the program commands stored in the memory 3. The initializing operations include starting the operation of the digital signal processor 4 and loading the parameters into the random access memory 22 of the digital signal processor. The electronic device 1 comprises also a high-frequency component 6 which in this embodiment is the transmitter/receiver unit of a mobile station, such as a GSM mobile station, comprising also a modulator and a demodulator. In these respects, the operation of the electronic device 1 shown in FIG. 1 corresponds primarily to the signalling operations to be conducted between the mobile station and the mobile communication network when starting up the GSM mobile station for entering the mobile communication network.

The audio parameters loaded into the digital signal processor 4 in the starting phase are advantageously audio parameters of default value defined according to a certain default value mode, for example the normal audio mode. These audio parameters are used in situations in which the auxiliary device 11 connected with the electronic device 1 does not support loading of audio parameters according to the invention, or in case the audio parameters cannot be loaded for any reason. Thus, to a great extent this operation mode corresponds to the operation of prior art.

Figure 2:
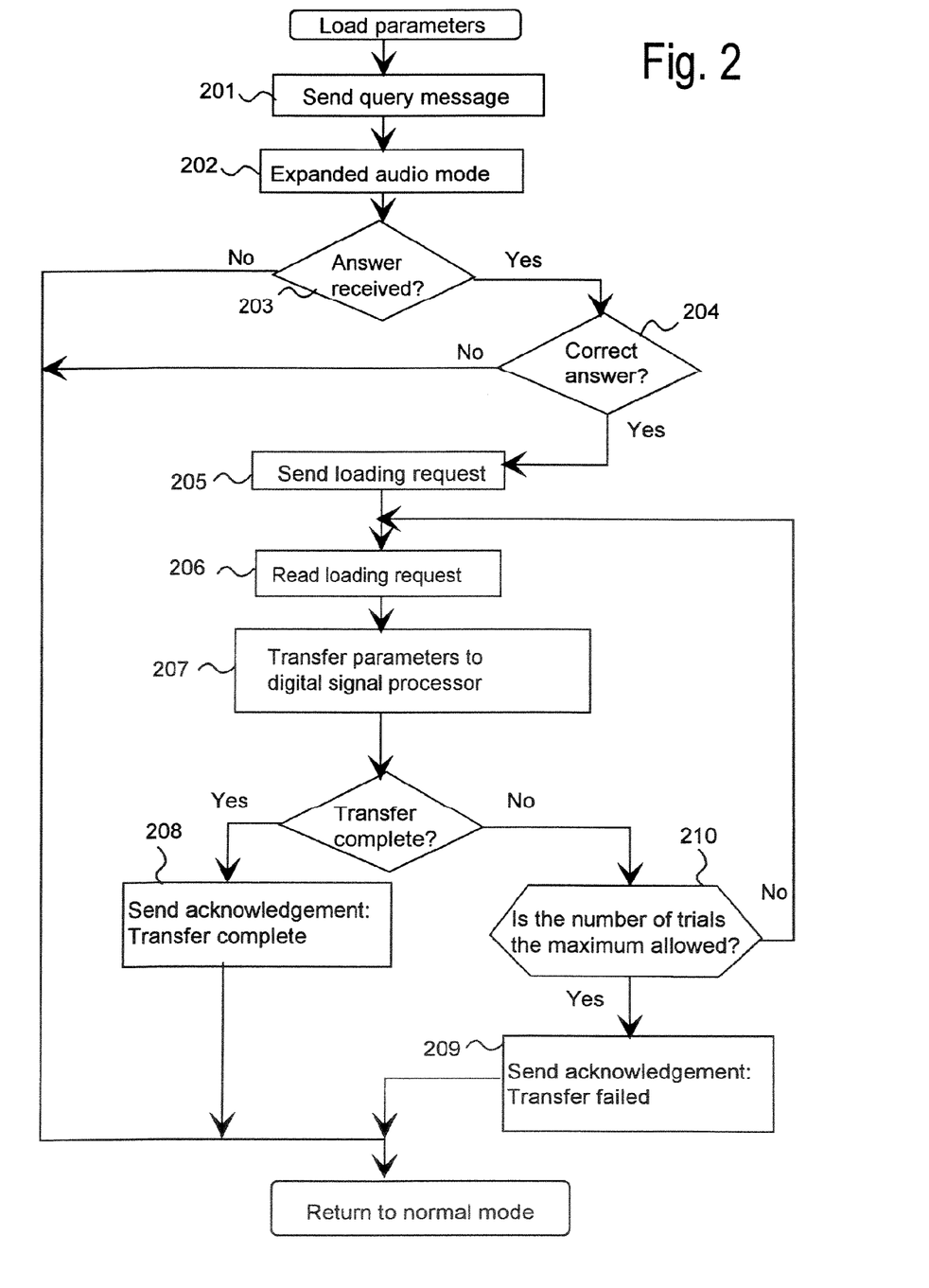
FIG. 2 is a flow chart showing the loading of parameters.

The loading of audio parameters according to a first advantageous embodiment of the invention, shown in a reduced flow chart in FIG. 2, is conducted from the auxiliary device 11 advantageously in connection with the booting operations of the electronic device 1 or when necessary, for example when setting up an audio call. The parameters are loaded for example via the auxiliary device connection 10. The auxiliary device 11 sends the electronic device 1 an audio parameter query message AUDIO_PARAMETERS_SUPPORT for finding out if it is possible to load new audio parameters from the auxiliary device 11 to the digital signal processor 4 of the electronic device 1 (block 201). The query message is for example a byte of 8 bits which is transferred in serial or parallel form via the auxiliary device connection 10 to the electronic device 1. An example of this is shown in Table 1. The received query message is noticed by the electronic device 1 and, if the electronic device 1 supports the operation according to the invention, it changes from the normal audio mode over to the expanded audio mode according to the invention (block 202) and sends the auxiliary device 11 an acknowledgement message AUDIO_PARAMETERS_SUPPORT which can be the same message as the query message. On the basis of the acknowledgement message, the auxiliary device 11 deduces that the new audio parameters can be loaded on the electronic device 1 (blocks 203 and 204). If the acknowledgement message is not received or the received acknowledgement message is not correct, no attempt will be made to load the new audio parameters into the electronic device 1.

TABLE 1

| 7 | 6 | 5 | 4 | 3 | 2 | 1 | 0 | bit |
|---|---|---|---|---|---|---|---|---|
| Code of the message (=AUDIO_PARAMETERS_SUPPORT) | | | | | | | | 1$^{st}$ byte |

After the correct acknowledgement message, the electronic device 1 sends the auxiliary device 11 a request for loading the audio parameters AUDIO_PARAMETERS_REQUEST (block 205). Also this message is advantageously a one-bit message, as shown in the example of Table 2.

TABLE 2

| 7 | 6 | 5 | 4 | 3 | 2 | 1 | 0 | bit |
|---|---|---|---|---|---|---|---|---|
| Code of the message (=AUDIO_PARAMETERS_REQUEST) | | | | | | | | 1$^{st}$ byte |

The auxiliary device 11 receives the message and interprets it, after which loading is started from the auxiliary device 11 to the electronic device 1. This can be conducted advantageously in one loading message AUDIO_PARAMETERS_UPDATE, exemplified in Table 3. The first byte in the loading message is the message code, the following two bytes give in this case the initial address of the parameters in the random access memory of the digital signal processor 4, i.e. the address into which the parameters to be transferred in the message will be stored in the electronic device 1. After the initial address (4th byte) comes the information on the number of the parameters, which in this case has the length of one byte, wherein a total of 256 parameters can be transferred in one message, which will be sufficient in most applications in practice. The number can be increased either by increasing the length of the number information or by sending the parameters in several loading messages. After the number information, the audio parameters are transferred, which normally comprise two bytes each. The parameters are typically transferred in a way that the most significant byte MSB comes first and this is followed by the least significant byte LSB. After all the parameters indicated by the number are transferred (block 206), the electronic device 1 stores the parameters in memory addresses reserved for the parameters in the random access memory 22 of the digital signal processor (block 207), in the same way as described above in this specification in connection with the audio parameters with default values to be loaded from the memory 3 of the controller 2.

TABLE 3

| 7 | 6 | 5 | 4 | 3 | 2 | 1 | 0 | Bit |
|---|---|---|---|---|---|---|---|---|
| code of the message (=AUDIO_PARAMETERS_UPDATE) | | | | | | | | 1st byte |
| initial address (MSB) | | | | | | | | 2nd byte |
| initial address (LSB) | | | | | | | | 3rd byte |
| number of parameters to be loaded | | | | | | | | 4th byte |
| 1st parameter (MSB) | | | | | | | | 5th byte |
| 1st parameter (LSS) | | | | | | | | 6th byte |
| ... | | | | | | | | (7-n)th byte |

After successful loading of the parameters, the electronic device 1 will send an acknowledgement message AUDIO_PARAMETERS_UPDATE_COMPLETE (Table 4) to the auxiliary device 11 (block 208) which, after receiving this, will stop the parameters loading operation and continue its normal operation. If the loading was not successful for any reason, the electronic device 1 will send an acknowledgement message AUDIO_PARAMETERS_UPDATE_FAILED (Table 5) on failed loading to the auxiliary device 11 as well as the code of reason for failure (block 209). Failure on loading can result e.g. from the fad that the electronic device 1 is not in such an audio operation mode in which the audio parameters are used, or the initial address in the loading message is incorrect. The loading address should be in a range reserved for audio parameters in the digital signal processor 4.

After failure on loading, re-loading of parameters can be attempted for example in a way that the auxiliary device 11 forms a new parameters loading message and the operation is the same as described above. For preventing a continuous retrial of loading, the number of loading retrials can be limited (block 210), and if the parameters cannot be loaded within the allowed loading trials, the digital signal processor 4 will use the parameters of default value.

TABLE 4

| 7 | 6 | 5 | 4 | 3 | 2 | 1 | 0 | bit |
|---|---|---|---|---|---|---|---|---|
| Code of the message (=AUDIO_PARAMETERS_UPDATE_COMPLETE) | | | | | | | | 1st byte |

TABLE 5

| 7 | 6 | 5 | 4 | 3 | 2 | 1 | 0 | bit |
|---|---|---|---|---|---|---|---|---|
| Code of the message (=AUDIO_PARAMETERS_UPDATE_FAILED) | | | | | | | | 1st byte |
| Code of reason for failure | | | | | | | | 2nd byte |

Figure 3:
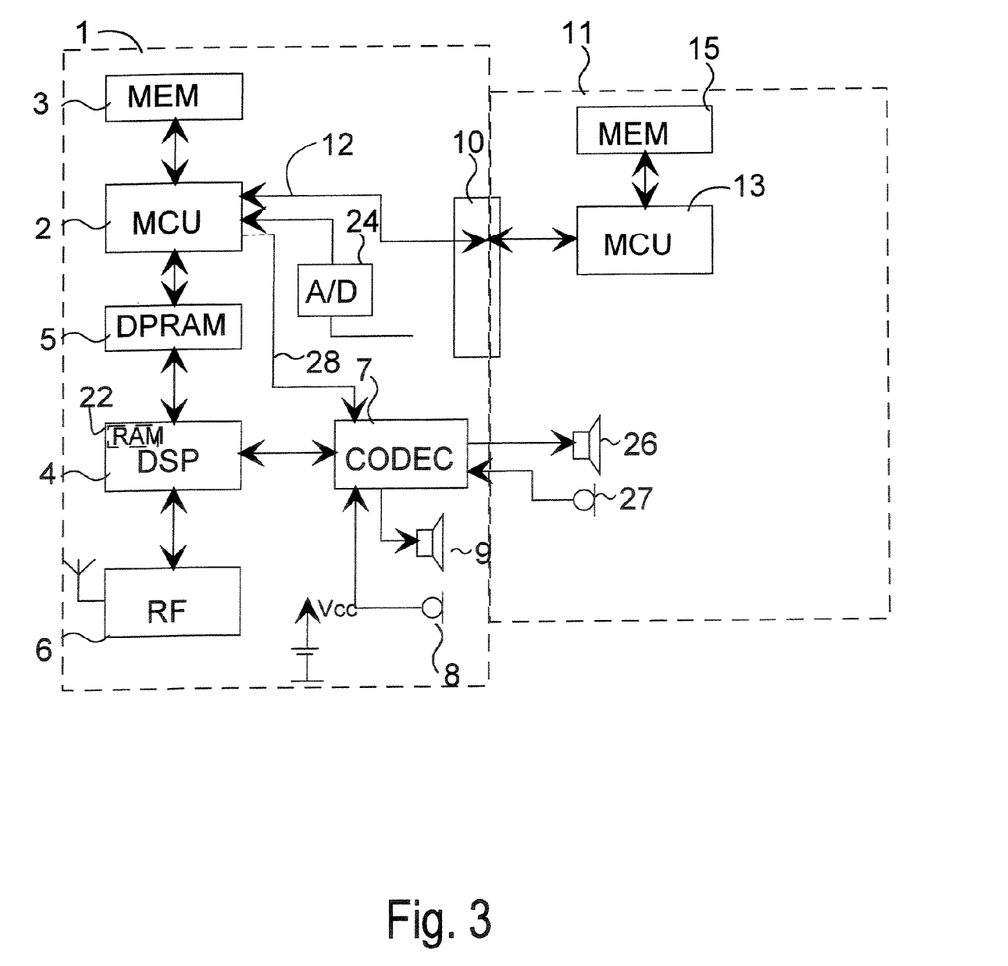
FIG. 3 shows another device, in which the aspects of the disclosed embodiments can be advantageously applied.

The loading of audio parameters can also be conducted when a new auxiliary device 11 is changed into the electronic device 1. As an example, the electronic device 1 shown in FIG. 3 is used, which is a mobile station, such as a GSM station. The connection of the auxiliary device 11 can be detected by means of messages to be transferred between the electronic device 1 and the auxiliary device 11. Instead of the microphone 8 and headphone 9 of the electronic device, the controller 2 selects the microphone 27 and headphone/loudspeaker 26 of the auxiliary device 11 to be used, for example in the same connection when the audio parameters intended for use in connection with the auxiliary device 11 are loaded into the digital signal processor 4. The selection is made advantageously by electrically controlled switches (not shown) which in the electronic devices 1 of the appended drawings are placed in the audio coding/decoding circuit 7. The control signal, such as a two-level voltage, is conducted by the switch control line 28.

The connection of the auxiliary device 11 to the electronic device 1 can be detected also by providing an interrupt signal to the controller 2. A controller interrupt line or the like (not shown) is conducted to the auxiliary device connection, and the interrupt request to the controller 2 is made by changing the state of the controller interrupt line for example from the logical 1 state to the logical 0 state. The application software of the controller 2 comprises an interrupt service program which the controller 2 starts to run. The interrupt service program starts the loading of parameters which can be conducted according to the operations described above. The practical implementation of the interrupt operations will depend inter alia on the type of the controller 2 and will be prior art of an expert in the field.

Although the description above deals with loading of the audio parameters in a situation when the auxiliary device is connected to the electronic device 1, it is also possible to load the audio parameters on the digital signal processor 4 at the stage when the auxiliary device 11 is disconnected. This can be detected by applying the principles described above in connection with connecting the auxiliary device 11 advantageously by a change in the voltage of a detecting line (not shown in FIG. 3) sending the controller 2 an interrupt message on the difference in state of the interrupt line.

If necessary, the loading of audio parameters can also be conducted when the auxiliary device 11 changes its audio mode. This is implemented advantageously in a way that the auxiliary device 11 informs the electronic device 1 of a need for loading the audio parameters for example by a message to be transferred via the expansion bus 12.

The following will be a description of loading the audio parameters from a writeable mass storage 25 according to a second advantageous embodiment of the invention. In this connection, reference is made to FIG. 4. The memory 3 of the electronic device 1 comprises a writeable mass storage 25, for example a FLASH memory circuit, containing at least part of the loadable audio parameters, either for one auxiliary device or the parameters for two or more auxiliary devices 11. The auxiliary device 11 has e.g. an auxiliary loudspeaker 26 and an auxiliary microphone 27. For each auxiliary device, the same storage area will be reserved for the audio parameters in the random access memory 22 of the digital signal processor, i.e. the parameters will be loaded into the random access memory 22 in the digital signal processor always starting from the same storage address. Thus the algorithms stored in the read-only memory of the digital signal processor can retrieve the parameters related to the algorithm from stable addresses in the random access memory 22 of the digital signal processor.

Figure 4:
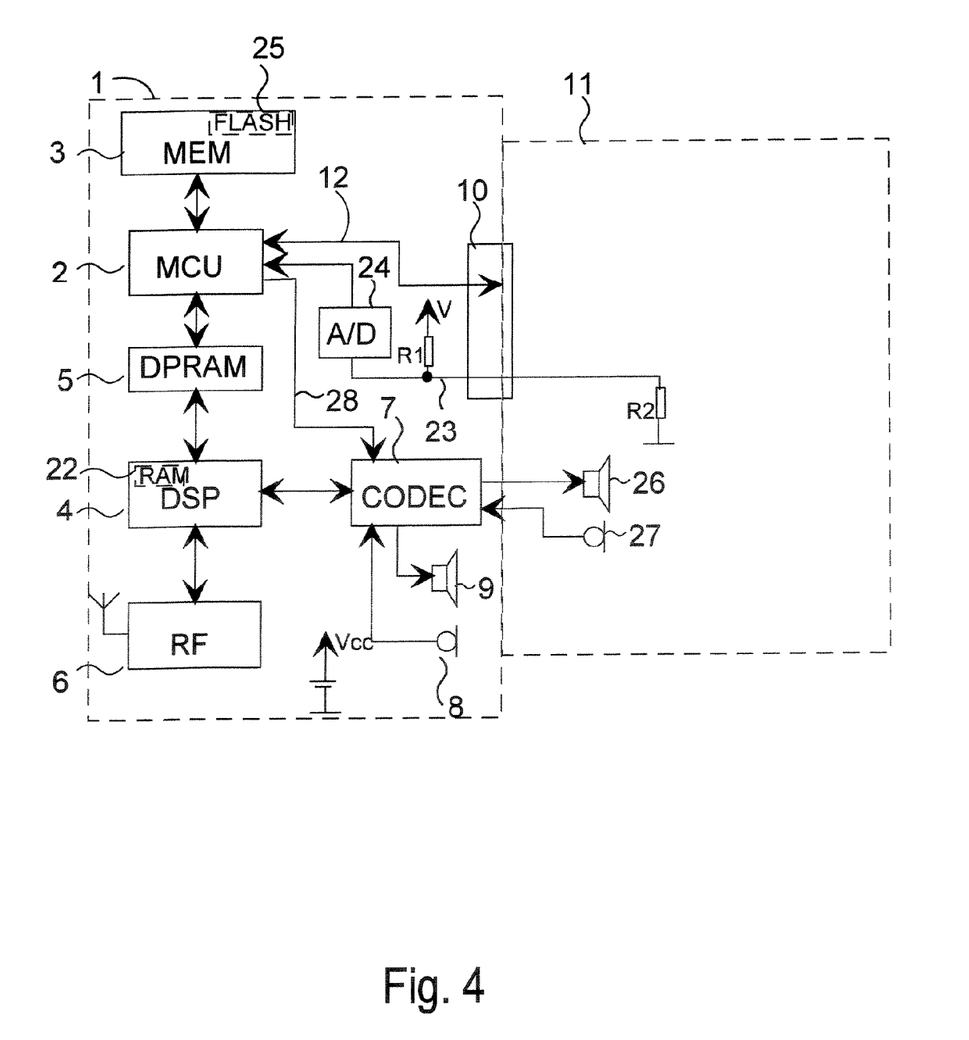
FIG. 4 shows still another device, in which the aspects of the disclosed embodiments can be advantageously applied.

The parameters are stored on the writeable mass storage for example in the following way. The parameters are first tuned for each auxiliary device and compiled by a data processor (not shown) into a file in which variables are reserved for the parameters of each auxiliary device. At the stage when the application software of the digital signal processor are formed by linking different program modules, said variables of different auxiliary devices are combined to overlap, i.e. to start from the same address. The way of implementation is known from programming. Thus the same memory block comprises several memory pages according to the number of the groups of parameters, each page containing the parameters of one auxiliary device. After combining, the memory pages are compiled by a so-called tool program into a definition file (e.g. a file with the name param.h when using e.g. the c programming language), in which all of the program code to be loaded on the digital signal processor are presented in different tables containing e.g. numbers of a system representing numbers in base sixteen (hexadecimal numbers). This file is annexed as a part of the application software of the controller 2 of the electronic device. This step is usually called compiling the program, wherein the starting code file is formed either into an object code, which must still be converted to a machine-language program, or directly into a machine-language program code. The machine-language program code is in a form that the controller to be used at the time can use it for operation. The machine-language program code is stored in the read-only memory of the controller which comprises advantageously the writeable mass storage 25. The program code will now comprise also the parameters stored in separate tables.

The controller 2 retrieves from said table the parameters to be introduced to the digital signal processor 4. The transfer to the digital signal processor 4 is made e.g. via a dual port memory 5. This principle is normally applied in digital signal processors 4 for loading such program codes which are not stored in the read-only memory of the digital signal processor 4 but are to be loaded only when necessary into the random access memory 22 of the digital signal processor 4.

The need for loading audio parameters can come up any time during the operation of the electronic device 1, wherein for loading the audio parameters it is advantageous to use a so-called message buffer which is a storage area reserved for this purpose in the storage area of the dual port circuit 5. At the stage when the parameters should be loaded, e.g. because of connecting an auxiliary device, this is detected by the controller 2 which retrieves the required parameters from the writeable mass storage 25. There is not necessarily sufficient space in the message buffer for all these parameters at a time, wherein the transfer to the digital signal processor 4 must be conducted in two or more parts. The controller 2 will divide the parameters into partial messages, label the title information of each partial message to be transferred with the number of the partial message, and transfer the partial messages one at a time to the message buffer. Writing to the message buffer will result in an interruption of the digital signal processor 4 coupled on the other side of the dual port circuit 5 and start an interrupt service program for processing the message. The message is processed either in the interrupt service program, or the interrupt service program sets a flag, i.e. the state of a certain bit in a certain storage address is changed as a sign of the received message. In the application software of the digital signal processor 4, the state of this bit is monitored continually, wherein after detecting a change in the state the digital signal processor 4 will run a message processing application program.

From the title information of the message, the message processor will detect the number of the partial message and the initial address for loading the parameters and copy the parameters from the message buffer into the random access memory of the digital signal processor 4 starting from the address given in the title information. After the digital signal processor 4 has copied the parameters, it indicates that the message buffer is empty, wherein the controller 2 can start sending the next partial message. Discharging of the message buffer can be informed for example in a way that the digital signal processor 4 writes a certain value in a predetermined storage address in the dual port circuit 5. The controller 2 reads this memory space continually and deduces from the read value whether the buffer is empty or not.

After transmitting all the necessary parameters, i.e. when the last partial message is transferred into the random access memory 22 of the digital signal processor 4, the digital signal processor 4 will initialize the algorithms with these new values and continue its normal operation. The controller 2 will advantageously silence the audio signals, i.e. the audio coding/decoding block 7. This is primarily to allow time to introduce the new parameters and prevent the production of extra noises, such as clicks and pops.

Loading the parameters in this way makes it possible to tune the parameters and compile them into tables separately, independently of the software development of the controller 2 of the electronic device 1, as long as the application software according to the loading mechanism presented above is loaded in the application software of the controller 2. This application software can be loaded into an electronic device which is already on the market for example in connection with maintenance, wherein updating can provide a possibility to load audio parameters for new auxiliary devices or changing the parameters for old auxiliary devices.

Also in this application it is possible to use the principles presented above for deducing when the audio parameters should be loaded onto the digital signal processor 4. The electronic device 1 recognizes advantageously the type of the auxiliary device 11 and selects on the basis of this information those audio parameters stored in the writeable mass storage 25 which are to be loaded. The auxiliary device 11 can be e.g. hands free equipment with an auxiliary loudspeaker and an auxiliary microphone. Connection of the auxiliary device 11 can be detected e.g. as a change in the voltage of a detection line 23. In this embodiment, the detection line 23 is coupled with a resistance R1 to a constant voltage V, wherein the voltage at one end of the resistance R1 corresponds substantially to the constant voltage V when no auxiliary device 11 is connected. The other end of the resistance R1 is connected with a pin of the auxiliary device connection 10 and to the controller 2 via an analog/digital converter 24.

The auxiliary device 11 has a resistance R2 which is connected to a pin corresponding to the detection line and whose one end is connected to the ground potential GROUND. When the auxiliary device 11 is connected to the auxiliary device connection 10 of the electronic device, the resistances R1 and R2 make up a voltage distributing switch, wherein the voltage in the detection line 23 is changed. The controller 2 reads continually the conversion result of the analog/digital converter 24, i.e. the numerical value corresponding to the voltage of the detection line. Upon a sufficient change in this value the controller 2 will deduce that an auxiliary device 11 is connected to the auxiliary device connection 10, wherein the controller 2 of the electronic device will move on to expanded audio mode and send an audio parameter query message AUDIO_PARAMETERS_SUPPORT to the auxiliary device 11. The operation corresponds to the loading of parameters as described above in this specification, which is referred to in this context.

The auxiliary device connection 10 and the detection can also be implemented in a way that the voltage of the detection line 23 is used for deducing the type of the auxiliary device 11 and the fact whether the audio parameters are needed and at which stage the loading should be conducted. Thus the resistance value of the resistance R2 varies with different types of auxiliary devices 11.

Now, the transmission of messages described above will not be needed for loading but it will be conducted advantageously so that the controller 2 retrieves from the storage area of the writeable mass storage 25 the parameters to be loaded into the memory 3 of the controller. After this, the audio parameters read into the memory 3 are transferred into the digital signal processor 4, as described above in this specification.

It is advantageous to implement loading from a writeable mass storage 25 inter alia for auxiliary devices 11 which do not include a microprocessor or the like for processing loading messages.

The invention is not limited merely to the embodiments presented above, but it can be varied within the scope of the appended drawings. The connection between the central processing unit 2 and the digital signal processor 4 can be implemented also in another way than with a dual port circuit. The electronic device 1 does not necessarily have a separate DSP circuit but the digital signal processor 4 can also be implemented in the application software of the central processing unit 2.

What is claimed is:

1. A method comprising:
   loading at least one audio parameter that controls processing in a digital signal processor from an auxiliary device into the digital signal processor, said at least one audio parameter being loaded from the auxiliary device via an auxiliary device connection, said digital signal processor configured to use said at least one audio parameter during operation of at least one other device when the auxiliary device is connected to the at least one other device so that said at least one audio parameter controls the processing of one or more audio signals transferred between the auxiliary device and the at least one other device via the auxiliary device connection, wherein the processing of the one or more audio signals is controlled in the digital signal processor dependent on said at least one audio parameter specifically for the auxiliary device during operation of the at least one other device when connected to the auxiliary device;
   said loading comprising communicating digital data between the at least one other device and a controller in said auxiliary device.

2. The method according to claim 1, further comprising loading the audio parameters at a stage when the auxiliary device is connected to or detached from the at least one other device or when the auxiliary device changes its audio mode.

3. The method according to claim 2, said loading further comprising instructing the at least one other device to transmit a command to a controller of the auxiliary device to send at least one audio parameter to the other device.

4. The method according to claim 1, wherein said audio parameter is other than data used to recognize the type of auxiliary device.

5. The method according to claim 1, wherein said at least one audio parameter is loaded into the digital signal processor from the auxiliary device.

6. An apparatus comprising:
   a digital signal processor configured to process audio signals;
   an interface configured to use at least one audio parameter that controls the processing of audio signals in the digital signal processor, said at least one audio parameter relating to audio properties of an auxiliary device when connected to at least one other device; and
   a communication interface configured to communicate with a controller of said auxiliary device to load said at least one audio parameter from the auxiliary device to said interface and to use said at least one audio parameter during operation of the other device when the auxiliary device is connected to the other device, said communication interface being configured to conduct communication of digital data between said controller of the auxiliary device and said apparatus so that said at least one audio parameter controls the processing of one or more audio signals transferred between the auxiliary device and the other device via the communication interface, wherein the processing of the one or more audio signals is controlled in the digital signal processor dependent on said at least one audio parameter specifically for the auxiliary device during operation of the other device when connected to the auxiliary device.

7. The apparatus according to claim 6, further comprising an input device configured to detect a connection of the auxiliary device to the other device.

8. The apparatus according to claim 7, wherein the input device is further configured to provide a detection data signal indicative of the connection of the auxiliary device to the at least one other device.

9. The apparatus according to claim 6, wherein the apparatus comprises a transmitter/receiver unit of a mobile station.

10. The apparatus according to claim 6, wherein said at least one audio parameter is other than data used to recognize the type of auxiliary device.

11. The apparatus according to claim 6, wherein said at least one audio parameter is loaded into the digital signal processor from the auxiliary device.

12. The apparatus according to claim 6, wherein said communication interface is configured to transmit a command to the controller of the auxiliary device to send at least one audio parameter from the auxiliary device to the apparatus.

13. The apparatus according to claim 6 comprising a memory configured to store said at least one audio parameter loaded from the auxiliary device.

14. An apparatus comprising:
   a digital signal processor configured to process audio signals;
   an interface configured to use at least one audio parameter that controls the processing of audio signals in the digital signal processor, said at least one audio parameter relating to audio properties of an auxiliary device when connected to the apparatus; and
   a communication interface configured to communicate with a controller of said auxiliary device to load said at least one audio parameter from the auxiliary device to said interface and to use said at least one audio parameter during operation of the apparatus when the auxiliary device is connected to the apparatus, said communication interface being configured to conduct communication of digital data between said controller of the auxiliary device and said apparatus so that said at least one audio parameter controls the processing of one or more audio signals transferred between the auxiliary device and the apparatus via the communication interface, wherein the processing of the one or more audio signals is controlled in the digital signal processor dependent on said at least one audio parameter specifically for the auxiliary device during operation of the apparatus when connected to the auxiliary device.

15. The apparatus according to claim 14, wherein said communication interface is configured to transmit a command to the controller of the auxiliary device to send at least one audio parameter from the auxiliary device to the apparatus.

* * * * *